US012179477B2

(12) United States Patent
Yamaguchi

(10) Patent No.: US 12,179,477 B2
(45) Date of Patent: Dec. 31, 2024

(54) MEDIUM CASSETTE

(71) Applicant: BROTHER KOGYO KABUSHIKI KAISHA, Nagoya (JP)

(72) Inventor: Masatomo Yamaguchi, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 955 days.

(21) Appl. No.: 17/207,855

(22) Filed: Mar. 22, 2021

(65) Prior Publication Data

US 2021/0300090 A1 Sep. 30, 2021

(30) Foreign Application Priority Data

Mar. 31, 2020 (JP) ................................ 2020-062025

(51) Int. Cl.
*B41J 15/04* (2006.01)
*B65H 16/02* (2006.01)

(52) U.S. Cl.
CPC .......... *B41J 15/044* (2013.01); *B65H 16/028* (2013.01)

(58) Field of Classification Search
None
See application file for complete search history.

(56) References Cited

U.S. PATENT DOCUMENTS 5,657,945 A * 8/1997 Bryant .................. B65H 19/12 242/595.1
2009/0032633 A1* 2/2009 Yoshioka ............ B65H 16/028 242/410
2010/0221054 A1 9/2010 Yamada et al.
2014/0255075 A1* 9/2014 Ohnishi .................. B41J 15/16 400/613
2017/0183183 A1* 6/2017 Nozaki ................ B65H 16/106
2017/0348989 A1* 12/2017 Sanada ................ B41J 11/0095
2019/0291481 A1* 9/2019 Yazawa ................ B65H 23/085
2022/0080753 A1* 3/2022 Kitahara ................ B41J 11/005
(Continued)

FOREIGN PATENT DOCUMENTS

JP S59-179376 A 10/1984
JP H04-037143 U 3/1992
(Continued)

OTHER PUBLICATIONS

Japanese Notice of Reasons for Refusal issued on Feb. 27, 2024 in the corresponding Japanese patent application JP 2020-062025 with English language machine translation.

*Primary Examiner* — William A. Rivera
(74) *Attorney, Agent, or Firm* — Scully, Scott, Murphy & Presser, P.C.

(57) ABSTRACT

A roll medium is accommodated in a medium cassette. The roll medium has a configuration where a continuous medium is rolled in a roll shape. The medium cassette has a supporter including two sets of support roller pairs which rotatably support the roll medium. The two sets of the support roller pairs are in contact with an outer peripheral surface of a lower part of the roll medium at each of end positions, where a lower end of the roll medium is sandwiched between the support roller pair, of the roll medium in a direction of a rotation axis of the roll medium, and are not in contact with the outer peripheral surface of the lower part of the roll medium at a central portion of the roll medium in the direction of the rotation axis.

6 Claims, 7 Drawing Sheets

(56) References Cited

U.S. PATENT DOCUMENTS

| | | | | |
|---|---|---|---|---|
| 2022/0212888 | A1* | 7/2022 | Tatematsu | B65H 16/02 |
| 2023/0037269 | A1* | 2/2023 | Jung | B41J 33/52 |
| 2023/0234377 | A1* | 7/2023 | Chiba | B41J 11/70 399/21 |
| 2023/0286296 | A1* | 9/2023 | Yamaguchi | B41J 11/663 |

FOREIGN PATENT DOCUMENTS

| | | | |
|---|---|---|---|
| JP | 2003-12167 | A | 1/2003 |
| JP | 2004-249595 | A | 9/2004 |
| JP | 2010-202306 | A | 9/2010 |
| JP | 2020-179456 | A | 11/2020 |

* cited by examiner

MEDIUM CASSETTE

CROSS-REFERENCE TO RELATED APPLICATION

This application is based upon and claims the benefit of priority from prior Japanese patent application No. 2020-062025, filed on Mar. 31, 2020, the entire contents of which are incorporated herein by reference.

TECHNICAL FIELD

The present disclosure relates to a medium cassette in which a roll medium is accommodated.

BACKGROUND

JP-A-2003-012167 discloses a sheet feeding cassette (medium cassette) detachably mounted to a mounting opening of an image forming apparatus main body and configured to accommodate a roll sheet (roll medium) in a pivotally supported state.

According to a support configuration of the roll sheet in the sheet feeding cassette disclosed in JP-A-2003-012167, it may be troublesome to replace the roll sheet. For example, when attaching a shaft of a new roll sheet to the sheet feeding cassette, it may be necessary to adjust a position of the roll sheet so that the shaft of the roll sheet is appropriately supported by a bearing of the sheet feeding cassette.

Therefore, in order to facilitate a replacement operation of the roll medium (for example, the roll sheet), the present inventors studied a configuration of the medium cassette where an entire outer peripheral surface of a lower part of a roll medium is supported over a direction of a rotation axis of the roll medium by a plurality of support rollers arranged adjacent to each other in the direction of the rotation axis of the roll medium on both sides between which a lower end of the roll medium is sandwiched. In this configuration, when roller outer diameters of the plurality of support rollers arranged in the direction of the rotation axis are not equal due to a manufacturing error and the like, the roll medium is supported in contact with a roller having the largest outer diameter. At this time, when the support roller is in contact with a central portion of the roll medium in the direction of the rotation axis, the rotation axis of the roll medium is relatively largely tilted. When the rotation axis of the roll medium is largely tilted in this way, a continuous medium (a continuous medium that configures the roll medium with being rolled in a roll shape) unrolled from the roll medium is likely to be skewed.

SUMMARY

The specification discloses a medium cassette that enables an easy replacement operation of a roll medium and enables to suppress a continuous medium from being skewed.

An aspect of the disclosure is a medium cassette, in which a roll medium having a configuration where a continuous medium is rolled in a roll shape is accommodated, the medium cassette including:

a supporter including two sets of support roller pairs configured to rotatably support the roll medium, in which the two sets of the support roller pairs are in contact with an outer peripheral surface of a lower part of the roll medium at each of end positions, where a lower end of the roll medium is sandwiched between the support roller pair, of the roll medium in a direction of a rotation axis of the roll medium, and are not in contact with the outer peripheral surface of the lower part of the roll medium at a central portion of the roll medium in the direction of the rotation axis.

According to the medium cassette of the present disclosure, the two sets of the support roller pairs of the supporter support the roll medium in contact with the outer peripheral surface of the lower part of the roll medium. Therefore, it is not necessary to adjust a position of the roll medium, so that it is possible to facilitate a replacement operation of the roll medium. It is possible to support both end positions without supporting the central portion of the roll medium by the two sets of the support roller pairs. Therefore, as compared to a configuration of supporting the central portion of the roll medium in the direction of the rotation axis, a tilt of the rotation axis is reduced. Thus, it is possible to suppress the continuous medium unrolled from the roll medium from being skewed.

BRIEF DESCRIPTION OF DRAWINGS

FIGS. SA and 5B depict a tilted situation of a rotation axis of a roll sheet when deviation in an upper and lower direction is generated in support positions in which the roll sheet is supported between two sets of support roller pairs, where

FIG. 7A is a sectional view of main parts and FIG. 7B is a plan view of main parts.

DETAILED DESCRIPTION

A printer 100 in which a sheet feeding cassette 1 in accordance with an embodiment of the present disclosure is adopted will be described.

Figure 1:
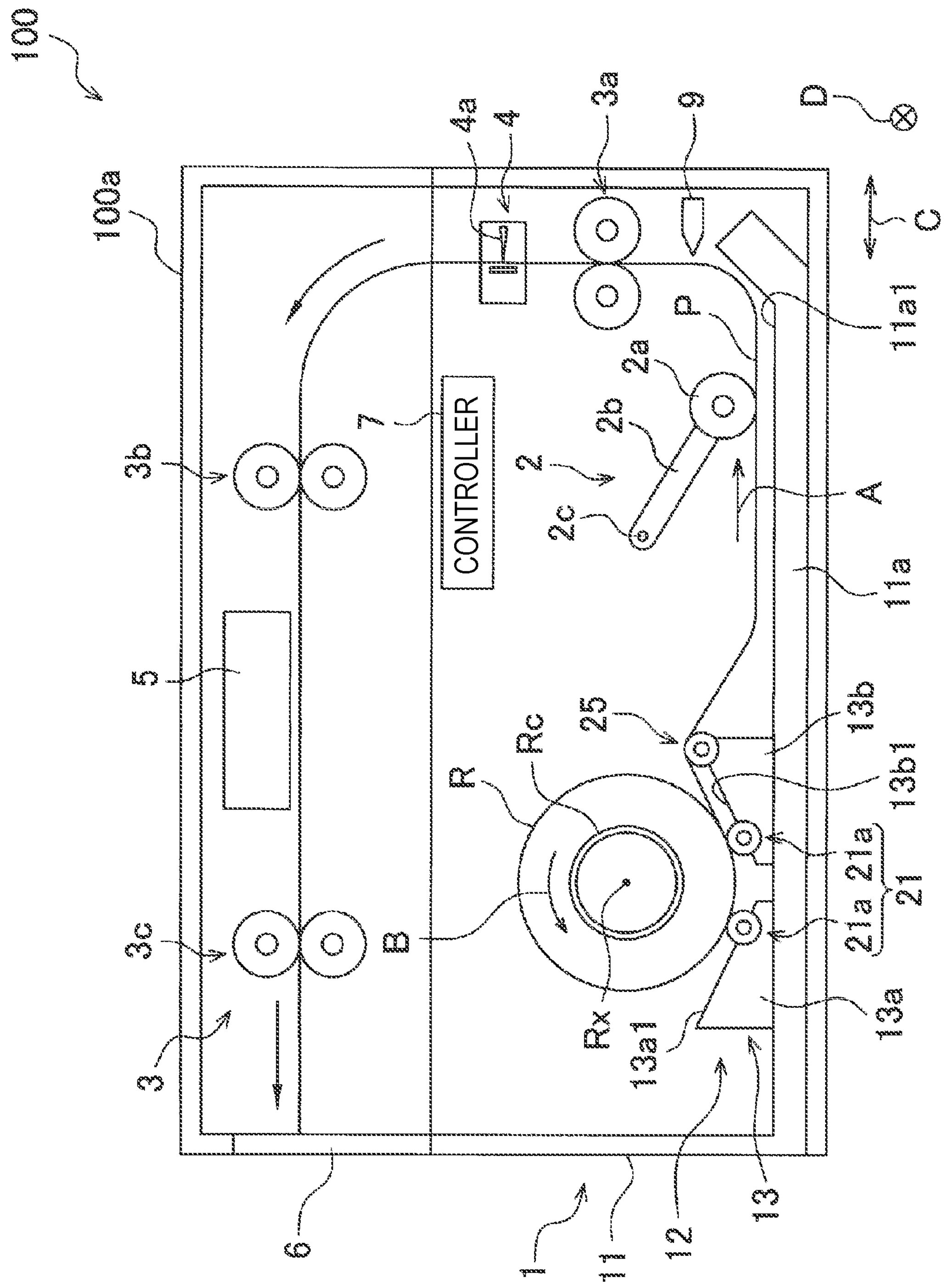
FIG. 1 is a schematic configuration view of a printer in which a sheet feeding cassette in accordance with an embodiment of the present disclosure is adopted.

As shown in FIG. 1, the printer 100 includes a housing 100*a*, a sheet feeding cassette 1, a sheet feeding unit 2, a conveyor unit 3, a cutting unit 4, a head 5, a sheet discharge unit 6, and a controller 7. The sheet feeding cassette 1 can be detachably mounted to a lower part of the housing 100*a*. The sheet feeding cassette 1 of the present embodiment corresponds to the "medium cassette". The sheet discharge unit 6 configures one side wall of an upper part of the housing 100*a*, and can be opened and closed with respect to the housing 100*a*.

In the sheet feeding cassette 1, roll sheets R1, R2 corresponding to the "roll medium" can be selectively accommodated. The roll sheet R1 is longer than the roll sheet R2 (which will be described later) in an axis direction D (a vertical direction of the drawing sheet of FIG. 1) and the other configurations are similar to the roll sheet R2. For this reason, the roll sheet R1 is mainly described, and the descriptions of the detailed configuration of the roll sheet R2 are omitted. As shown in FIG. 1, the roll sheet R1 has a configuration where a sheet P corresponding to the "continuous medium" is rolled in a roll shape on an outer peripheral surface of a cylindrical core member (paper tube) Rc. The sheet P is paper or cloth. The roll sheet R1 is arranged so that an axis direction D along a rotation axis Rx (a central axis of the core member Rc) is orthogonal to a vertical direction. The roll sheet R2 is also arranged in a similar manner. The axis direction D of the rotation axis Rx is also a width direction of the sheet P.

In the present embodiment, a direction A in which the sheet P is unrolled from the roll sheet R1 and is conveyed away from the roll sheet R1 is a conveying direction. A rotating direction of the roll sheet R1 while the sheet P is conveyed is an unrolling direction B of the roll sheet R1.

As shown in FIG. 1, the sheet feeding cassette 1 includes a tray 11, and a supporter 12. The tray 11 has a box shape opened upward, and is configured so as to selectively accommodate the roll sheets R1, R2. The supporter 12 includes a support base 13, four sets of support roller pairs 21 to 24, and a roller 25, and rotatably supports the roll sheet R1 while supporting outer peripheral surfaces of lower parts of the accommodated roll sheets R1, R2.

Figure 2:
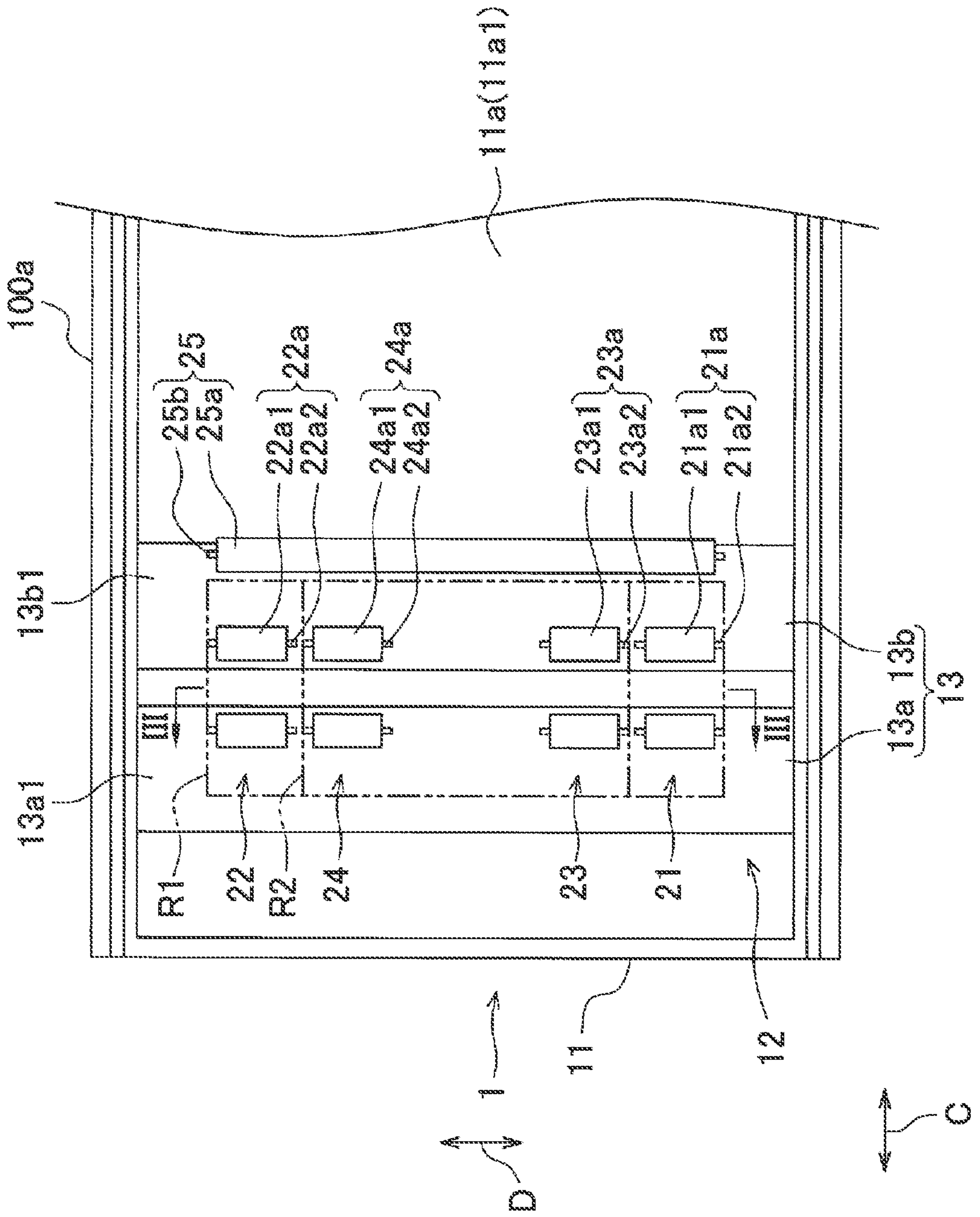
FIG. 2 is a partially enlarged plan view of the sheet feeding cassette.

As shown in FIGS. 1 and 2, the support base 13 includes two base parts 13*a*, 13*b* apart from each other in a horizontal direction C orthogonal to the rotation axis Rx. As shown in FIG. 1, the two base parts 13*a*, 13*b* are provided to be detachably mounted on a bottom part 11*a* of the tray 11. As shown in FIG. 2, each of the base parts 13*a*, 13*b* extends long in the axis direction D. In the present embodiment, the base parts 13*a*, 13*b* are formed to be slightly longer than a width of the sheet P, i.e., the roll sheet R1. The base part 13*a* is arranged at the left of the rotation axis Rx of the roll sheet R1 supported on the supporter 12, in FIG. 1. The base part 13*a* has an inclined surface 13*al*. The base part 13*b* is arranged at the right of the rotation axis Rx of the roll sheet R1 supported on the supporter 12, in FIG. 1. The base part 13*b* has also an inclined surface 13*b*1. As shown in FIG. 1, the two inclined surfaces 13*al*, 13*b*1 of the support base 13 are each inclined so that a height from a bottom surface llal of the tray 11 increases in the horizontal direction C as a distance from the rotation axis Rx increases.

Figure 3:
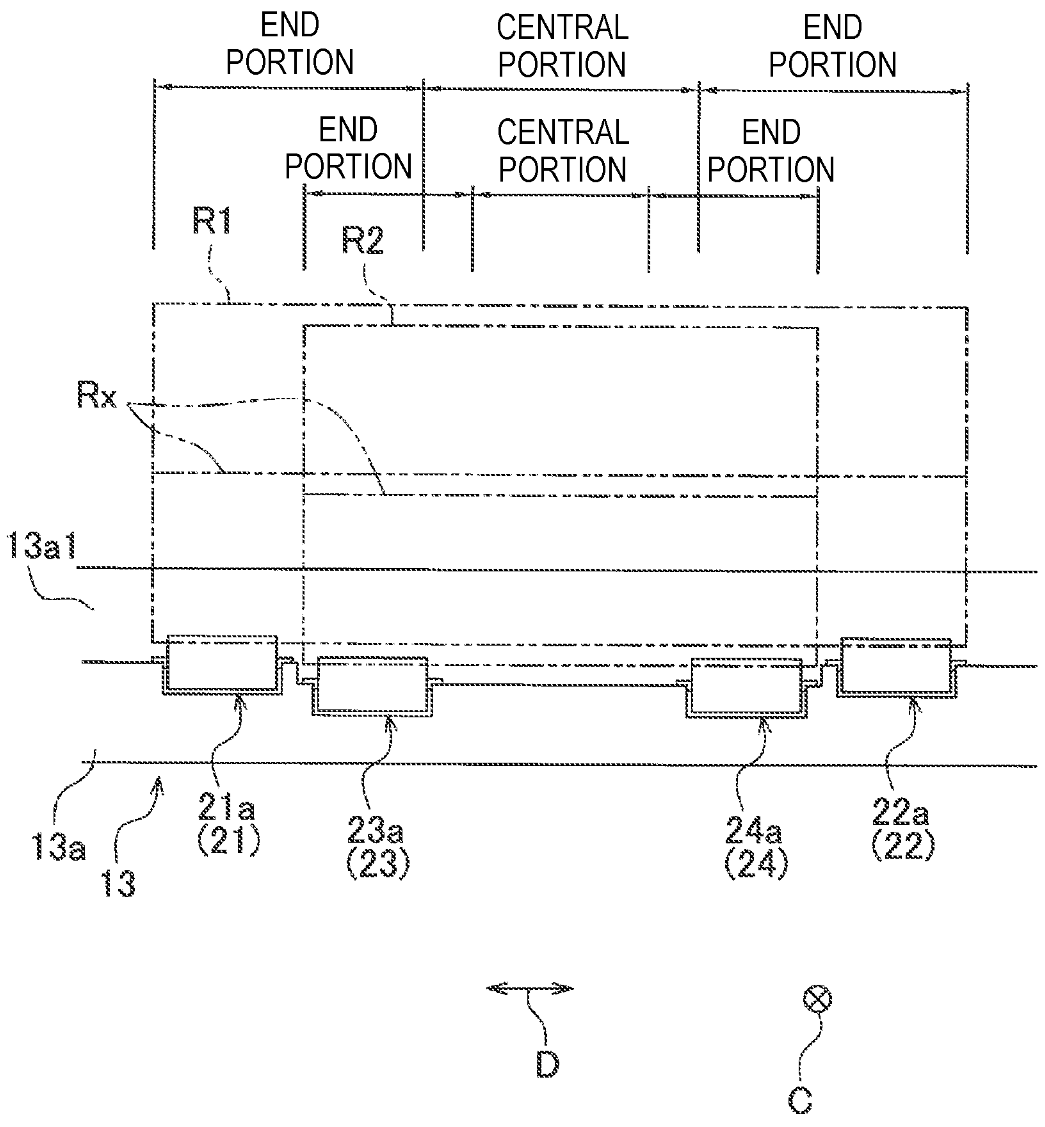
FIG. 3 is a sectional view of a supporter taken along a line III-III of FIG. 2.

As shown in FIGS. 2 and 3, two sets of the support roller pairs 21, 22 are each configured by two support rollers 21*a*, 22*a* arranged in positions where a lower end of the roll sheet R1 is sandwiched between the support rollers 21*a*, 22*a* in the horizontal direction C. The two sets of the support roller pairs 23, 24 are each configured by two support rollers 23*a*, 24*a* arranged in positions where a lower end of the roll sheet R2 is sandwiched between the two support rollers 23*a*, 24*a* in the horizontal direction C. The support rollers 21*a* to 24*a* are each arranged on lower sides of the inclined surfaces 13*al*, 13*b*1. As shown in FIGS. 2 and 3, the support rollers 21*a* to 24*a* each have a cylindrical roller main body 21*al* to 24*al* and a shaft part 21*a*2 to 24*a*2 inserted in each of the roller main bodies 21*al* to 24*al*. The shaft parts 21*a*2 to 24*a*2 are integrally fixed to the roller main bodies 21*al* to 24*al*, respectively. The support rollers 21*a* to 24*a* are individually rotatably supported on the support base 13 via the shaft parts 21*a*2 to 24*a*2. That is, the support roller pairs 21 to 24 of each set are each configured by the individually rotatable support rollers 21*a* to 24*a*. The support rollers 21*a* to 24*a* of the present embodiment correspond to the "individual rollers".

As shown in FIG. 2, the four sets of the support roller pairs 21 to 24 are arranged in the axis direction D, and the two sets of the support roller pairs 21, 22 are arranged on the outermost sides in the axis direction D. That is, the two sets of the support roller pairs 23, 24 are arranged on an inner side of the two sets of the support roller pairs 21, 22 in the axis direction D. As shown in FIGS. 2 and 3, the two sets of the support roller pairs 21, 22 are in contact with the outer peripheral surface of the lower part of the roll sheet R1 in both end positions of the roll sheet R1 in the axis direction D, and rotatably support the roll sheet R1 from below. The two sets of the support roller pairs 21, 22 are not in contact with the outer peripheral surface of the lower part of the roll sheet R1 at a central portion of the roll sheet R1 in the axis direction D. The two sets of the support roller pairs 21, 22 of the present embodiment correspond to the "two sets of the support roller pairs". In the present embodiment, as shown in FIG. 3, each of the roll sheets R1, R2 is divided into substantially equal portions in the axis direction D, portions positioned at both ends in the axis direction D are defined as end portions, and a portion between the end portions is defined as a central portion, which correspond to the "end portions" and the "central portion".

As shown in FIGS. 2 and 3, the two sets of the support roller pairs 23, 24 are in contact with the outer peripheral surface of the lower part of the roll sheet R2 in both end positions of the roll sheet R2 in the axis direction D. and rotatably support the roll sheet R2 from below. The two sets of the support roller pairs 23, 24 are not in contact with the outer peripheral surface of the lower part of the roll sheet R2 at a central portion of the roll sheet R2 in the axis direction D. As shown in FIG. 3, the two sets of the support roller pairs 23, 24 each have an upper end arranged at a power position than an upper end of each of the two sets of the support roller pairs 21, 22. That is, the two sets of the support roller pairs 23, 24 are arranged so as not to contact the roll sheet R1 supported by the two sets of the support roller pairs 21, 22. The two sets of the support roller pairs 23, 24 of the present embodiment corresponds to the "two sets of the inner support roller pairs".

The roller 25 is a roller for guiding the sheet P unrolled from the roll sheet R. and extends long in the axis direction D. As shown in FIG. 2, the roller 25 also has a cylindrical roller main body 25*a* and a shaft part 25*b* inserted in the roller main body 25*a*. The shaft part 25*b* is integrally fixed to the roller main body 25*a*. The roller 25 is rotatably supported on the support base 13 via the shaft part 25*b*.

Figure 4:
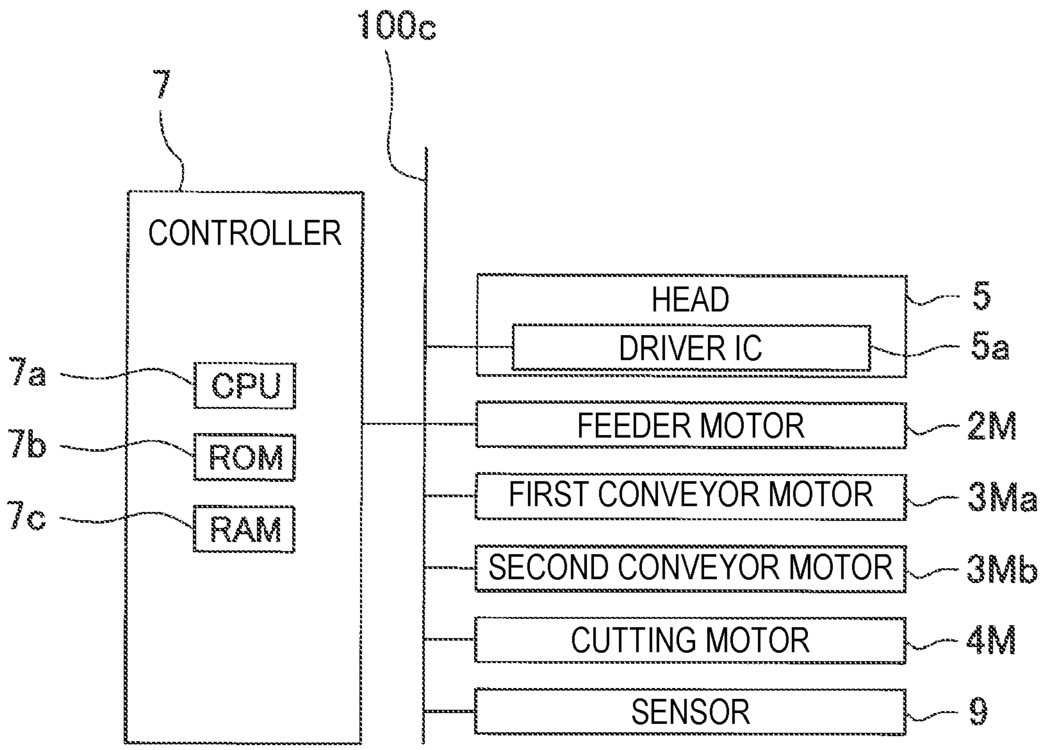
FIG. 4 is a block diagram depicting an electrical configuration of the printer shown in FIG. 1.

As shown in FIG. 1, the sheet feeding unit 2 includes a feeder roller 2*a*, an arm 2*b*, a transmission mechanism (not shown), and a feeder motor 2M (refer to FIG. 4). The feeder roller 2*a* is pivotally supported to a tip end of the arm 2*b*. The arm 2*b* is rotatably supported to a support shaft 2*c*. When the feeder motor 2M is driven under control of the controller 7, the transmission mechanism transmits power of the feeder motor to the feeder roller 2*a*. That is, when the feeder motor 2M is driven to forward rotate, the feeder roller 2*a* is rotated so that the sheet P is fed in the conveying direction A. At this time, the transmission mechanism urges the arm 2*b* so that the feeder roller 2*a* comes close to the bottom surface 11*a*1 of the tray 11. Thereby, the sheet P is fed in the conveying direction A. The arm 2*b* is configured to retreat upward when detaching the sheet feeding cassette 1.

As shown in FIG. 1, the conveyor unit 3 includes three sets of conveying roller pairs 3*a* to 3*c*, a first conveyor motor 3Ma (refer to FIG. 4), and a second conveyor motor 3Mb (refer to FIG. 4). The conveying roller pair 3*a* is configured by a drive roller configured to rotate by drive of the first conveyor motor 3Ma and a driven roller configured to rotate in conjunction with the drive roller. The two sets of the conveying roller pairs 3*b*, 3*c* are each configured by a drive roller configured to rotate by drive of the second conveyor motor 3Mb and a driven roller configured to rotate in conjunction with the drive roller. The first and second conveyor motors 3Ma, 3Mb are driven under control of the controller 7 and each of the conveying roller pairs 3*a* to 3*c* rotates sandwiching the sheet P, so that the sheet P is conveyed.

As shown in FIG. 1, the sensor 9 is provided to the housing 100*a*, and is arranged on a side upstream of the conveying roller pair 3*a* and downstream of the feeder roller 2*a* with respect to the conveying direction A of the sheet P. The sensor 9 is also configured to detect a tip end of the sheet P between the conveying roller pair 3*a* and the feeder roller 2*a* in the conveying direction A of the sheet P and to output a detection signal to the controller 7.

As shown in FIG. 1, the cutting unit 4 is fixed to the housing 100*a*, and is arranged above the conveying roller pair 3*a*. The cutting unit 4 includes a cutter 4*a*, and a cutting motor 4M (refer to FIG. 4) configured to drive the cutter 4*a*. The cutting motor 4M is driven under control of the controller 7, so that the sheet P unrolled and conveyed from the roll sheet R1 is cut by the cutter 4*a*. Thereby, a rear end of the sheet P is formed.

The head 5 includes a plurality of nozzles (not shown) formed on a lower surface, and a driver IC 5*a* (refer to FIG. 4). When the driver IC Sa is driven under control of the controller 7, ink is ejected from the nozzles, so that an image is recorded on the sheet P conveyed by the conveyor unit 3. The head 5 may be a line type configured to eject ink from nozzles in a position fixed state or a serial type configured to eject ink from nozzles while moving in the axis direction D. The sheet P having an image recorded by the head 5 and cut by the cutter 4*a* is accommodated on the sheet discharge unit 6 opened with respect to the housing 100*a*.

As shown in FIG. 4, the controller 7 is connected to the feeder motor 2M, the first conveyor motor 3Ma, the second conveyor motor 3Mb, the driver IC 5*a*, the cutting motor 4M and the sensor 9 via an internal bus 100*c*.

The controller 7 includes a CPU (Central Processing Unit) 7*a*, a ROM (Read Only Memory) 7*b*, and a RAM (Random Access Memory) 7*c*. In the ROM 7*b*, programs and data necessary for the CPU 7*a* to execute a variety of controls are stored. In the RAM 7*c*, data that is used when the CPU 7*a* executes the programs is temporarily stored.

Subsequently, an image recording operation that is performed on the sheet P of the roll sheet R1 accommodated in the sheet feeding cassette 1 is described.

When a recording command is received, the controller 7 drives the feeder motor 2M to rotate forward. Thereby, the sheet P is fed in the conveying direction A by the feeder roller 2*a*. At this time, the two sets of the support roller pairs 21, 22 that support both end portions of the roll sheet R1 in the axis direction D are rotated in conjunction with the rotation of the roll sheet R1 as the feeder roller 2*a* feeds the sheet P. When a signal indicative of detection of the tip end of the sheet P is received from the sensor 9, the controller 7 drives the feeder motor 2M to a position in which the tip end portion of the sheet P can be sandwiched by the conveying roller pair 3*a*, and then stops the same. Thereafter, the controller 7 drives the first and second conveyor motors 3Ma, 3Mb to rotate forward, thereby conveying the sheet P by the three sets of the conveying roller pairs 3*a* to 3*c*. When the sheet P passes a position facing the head 5, the controller 7 drives the driver IC 5*a* to eject ink from the nozzles of the head 5. In this way, a desired image is recorded on the sheet P. At this time, the controller 7 also stops the drive of the first and second conveyor motors 3Ma, 3Mb. and then drives the cutting motor 4M to cut the sheet P in a desired position. Thereafter, the controller 7 drives the second conveyor motor 3Mb to convey the cut sheet P. When further recording an image on the sheet P, the controller 7 drives the driver IC Sa to eject ink from the nozzles of the head 5. Then, the controller 7 discharges the sheet P having an image formed thereon to the sheet discharge unit 6, and stops the drive of the second conveyor motor 3Mb. In this way, a series of image recording operations on the sheet P of the roll sheet R1 are over.

When recording an image on the sheet P of the roll sheet R2, the roll sheet R2 other than the roll sheet R1 is accommodated in the sheet feeding cassette 1. At this time, the roll sheet R2 is supported at both end portions in the axis direction D by the two sets of the support roller pairs 23, 24. Then, the sheet P of the roll sheet R2 is conveyed and an image is formed thereon, in a similar manner to the case of the roll sheet R1. At this time, the two sets of the support roller pairs 23, 24 are rotated in conjunction with the rotation of the roll sheet R2 as the sheet is conveyed. Thereafter, the sheet P having an image formed thereon is discharged to the sheet discharge unit 6, and a series of image recording operations on the sheet P of the roll sheet R2 are over.

Figure 5A:
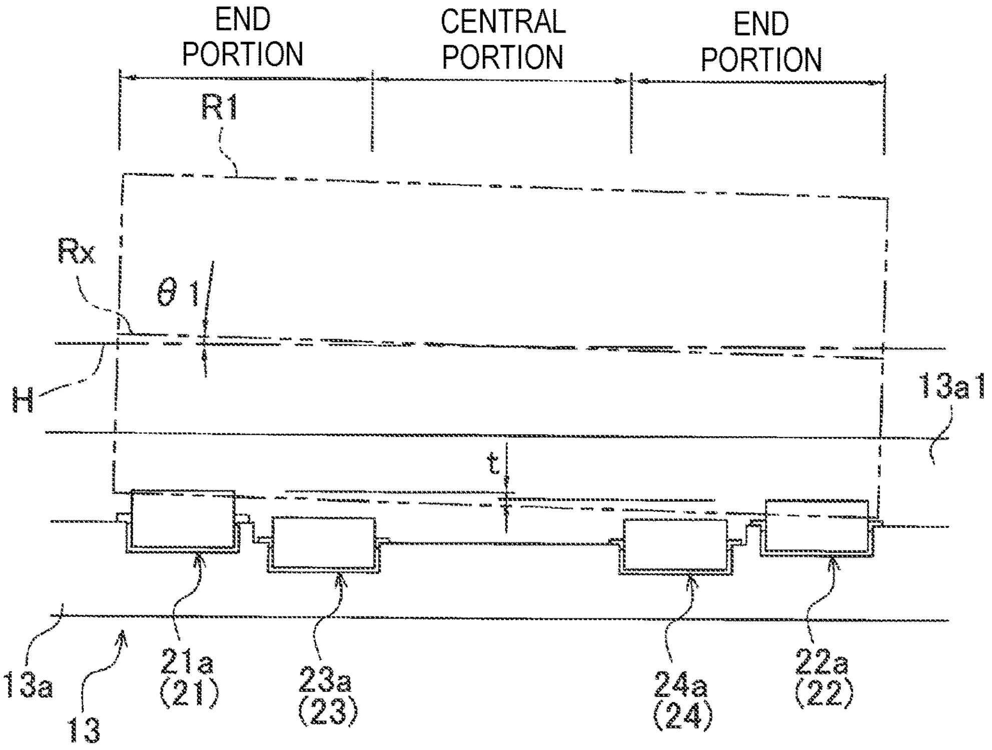
FIG. 5A depicts a situation where both end portions of the roll sheet are supported and FIG. 5B depicts a situation where one support roller pair supports a central portion of the roll sheet and the other support roller pair supports end portions of the roll sheet.

Due to a manufacturing error of each of the support rollers 21*a*, 22*a* configuring the two sets of the support roller pairs 21, 22, an attaching error to the support base 13, and the like, for example, as shown in FIG. 5A, a deviation amount t may be generated in heights of the right and left support positions in which the two sets of the support roller pairs 21, 22 contact and support the roll sheet R1.

Figure 5B:
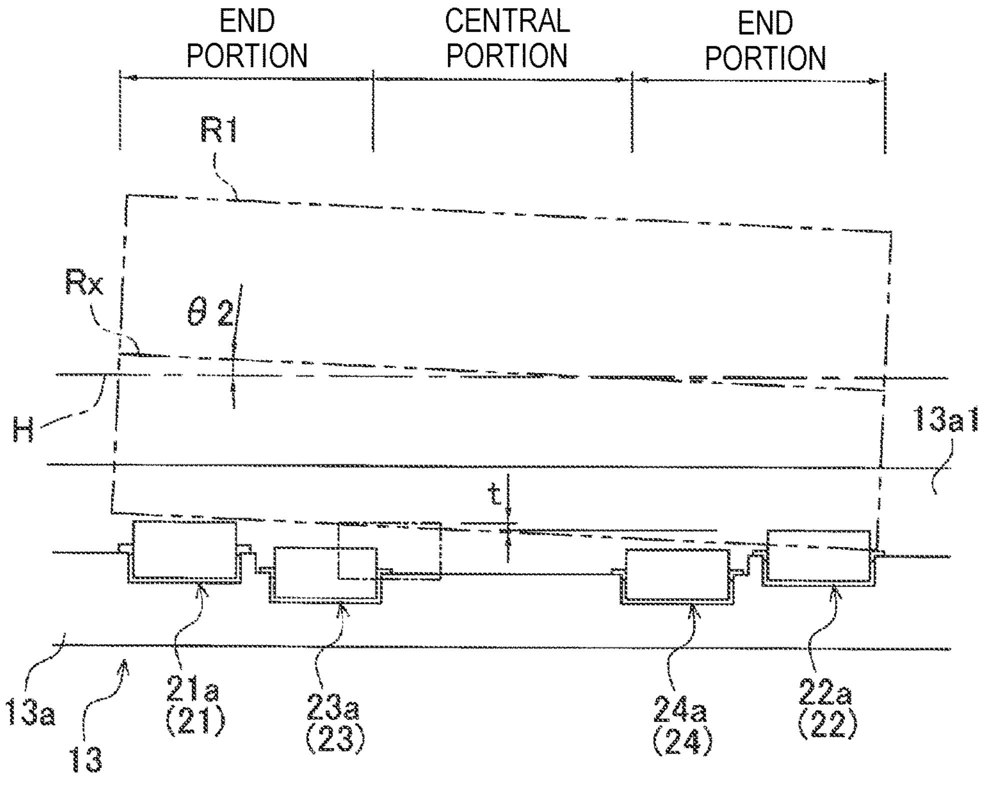

In the present embodiment, since the roll sheet R1 shown with the dashed-two dotted line in FIG. 2A is supported downward at both end portions in the axis direction D, a tilt angle $\theta 1$ of the rotation axis Rx with respect to a horizontal line H passing through a center of the roll sheet R1 in the axis direction D can be suppressed from increasing and can be made small. On the other hand, as shown with the dashed-two dotted line in FIG. 5B, in a case where the deviation amount t is the same and one (left) support roller supports the central portion of the roll sheet R1, a tilt angle $\theta 2$ of the rotation axis Rx with respect to the horizontal line H becomes greater than the tilt angle $\theta 1$.

Also in a case of the support rollers 23*a*, 24*a* configuring the two sets of the support roller pairs 23, 24, due to a manufacturing error, an attaching error to the support base 13, and the like, a deviation amount may be generated at the right and left support positions in which the two sets of the support roller pairs 23, 24 support the roll sheet R2. Also in this case, since the roll sheet R2 is supported downward at both end portions in the axis direction D, a tilt angle of the rotation axis Rx with respect to the horizontal line H passing through a center of the roll sheet R2 in the axis direction D can be suppressed from increasing and can be made small, similarly to the above case.

As described above, according to the sheet feeding cassette 1 of the present embodiment, the two sets of the support roller pairs 21, 22 support the roll sheet R1 in contact with the outer peripheral surface of the lower part of the roll sheet R1, and the two sets of the support roller pairs 23, 24 support the roll sheet R2 in contact with the outer peripheral surface of the lower part of the roll sheet R2. For this reason, it is not necessary to adjust positions of the roll sheets R1, R2, so that it is possible to facilitate a replacement operation of the roll sheets R1, R2.

It is possible to support both end positions of the roll sheet R1 without supporting the central portion of the roll sheet R1 by the two sets of the support roller pairs 21, 22. Thereby, even when a slight deviation in the upper and lower direction is generated at the support positions in which the two sets of the support roller pairs 21, 22 contact and support the roll sheet R1, a tilt of the rotation axis Rx is reduced, as compared to a configuration of supporting the central portion of the roll sheet R1 in the axis direction D. For this reason, it is possible to suppress the sheet P unrolled from the roll sheet R1 from being skewed.

It is possible to support both end positions of the roll sheet R2 without supporting the central portion of the roll sheet R2 by the two sets of the support roller pairs 23, 24. Thereby, even when a slight deviation in the upper and lower direction is generated at the support positions in which the two sets of the support roller pairs 23, 24 contact and support the roll sheet R2, a tilt of the rotation axis Rx is reduced, as compared to a configuration of supporting the central portion of the roll sheet R2 in the axis direction D. For this reason, it is possible to suppress the sheet P unrolled from the roll sheet R2 from being skewed. Therefore, for each of the plurality of types of the roll sheets R1, R2 having different lengths in the axis direction D, it is possible to suppress the sheet P unrolled from each of the roll sheets R1, R2 from being skewed.

The support rollers 21*a* to 24*a* configuring the four sets of the support roller pairs 21 to 24 are each configured by the individual rollers having the shaft parts 21*a*2 to 24*a*2. Thereby, since each of the support rollers 21*a* to 24*a* is configured by the individual roller having a relatively short length in the axis direction D, it is possible to reduce the manufacturing cost.

Figure 6:
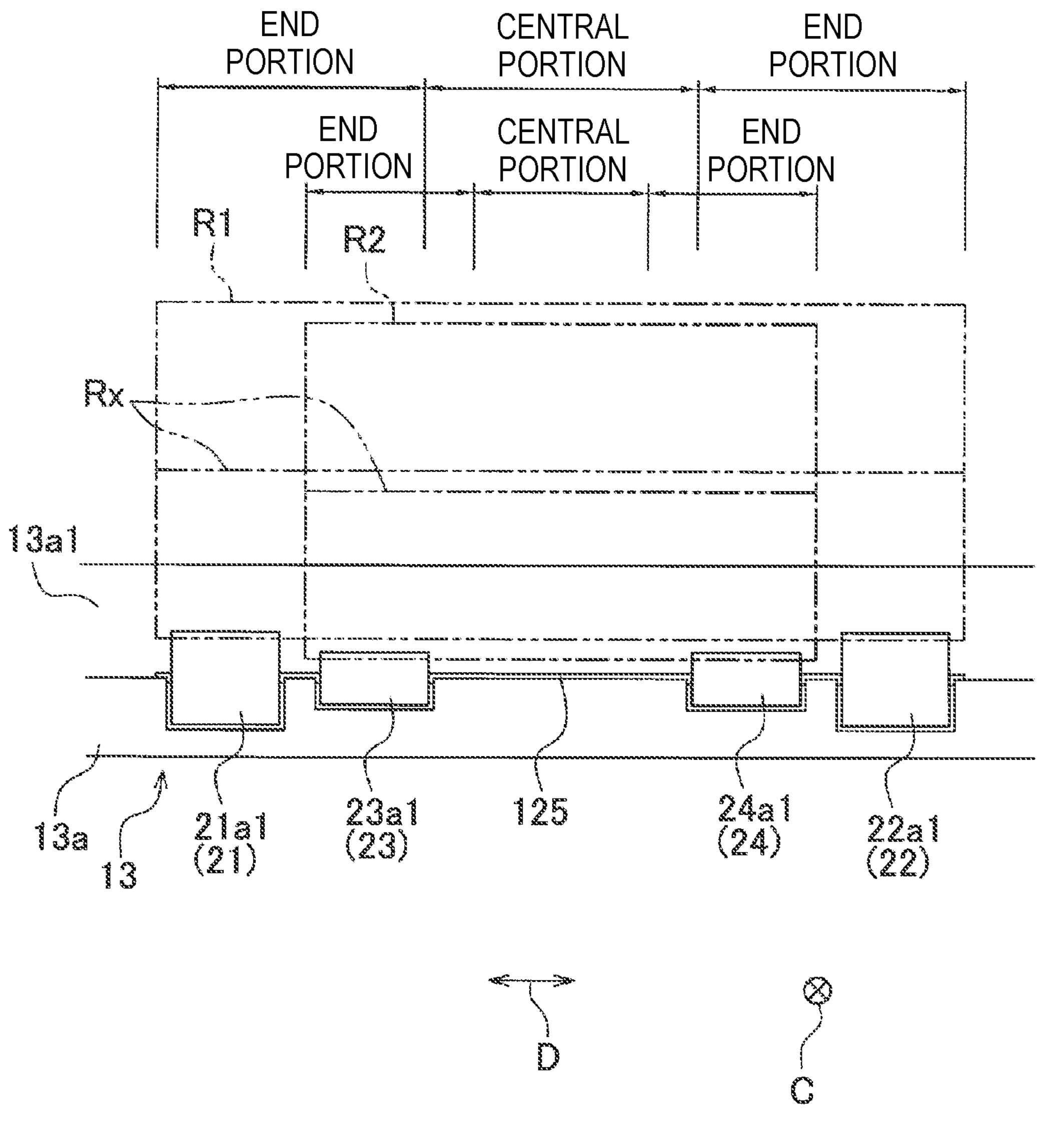
FIG. 6 is a sectional view of main parts of a supporter in accordance with a first modified embodiment.

As a first modified embodiment, as shown in FIG. 6, the two sets of the support roller pairs 21, 22 that support both end portions of the roll sheet R1 in the axis direction D and the two sets of the support roller pairs 23, 24 that are arranged on an inner side of the two sets of the support roller pairs 21, 22 and support both end portions of the roll sheet R2 in the axis direction D may have two common shaft parts 125. That is, among the roller main bodies 21*al* to 24*al* configuring the four sets of the support roller pairs 21 to 24, the roller main bodies arranged on each of both sides between which the lower ends of the roll sheets R1, R2 are sandwiched in the horizontal direction C are rotatably inserted in the common shaft part 125. The roller main bodies 21*al* to 24*al* are individually rotatably supported on the support base 13 via the shaft parts 125. The roller main bodies 21*al* to 24*al* of the present modified embodiment each correspond to the "roller", and the shaft parts 125 of the present modified embodiment each correspond to the "shaft part".

As shown in FIG. 6, all of the roller main bodies 21*al*, 22*al* configuring the two sets of the support roller pairs 21, 22 have the same diameter. All of the roller main bodies 23*al*, 24*al* configuring the two sets of the support roller pairs 23, 24 also have the same diameter. The diameter of each of the roller main bodies 21*al*, 22*al* is larger than the diameter of each of the roller main bodies 23*al*, 24*al*. Thereby, the upper ends of the two sets of the support roller pairs 23, 24 are arranged in positions lower than the two sets of the support roller pairs 21, 22.

Also in the first modified embodiment, the two sets of the support roller pairs 21, 22 support both end portions of the roll sheet R1 in the axis direction D, and the two sets of the support roller pairs 23, 24 support both end portions of the roll sheet R2 in the axis direction D. For this reason, it is possible to achieve the similar effects to the above embodiment. The four sets of the support roller pairs 21 to 24 have the common shaft parts 125, so that it is possible to easily mount the roller main bodies 21*al* to 24*al.*

Figure 7A:
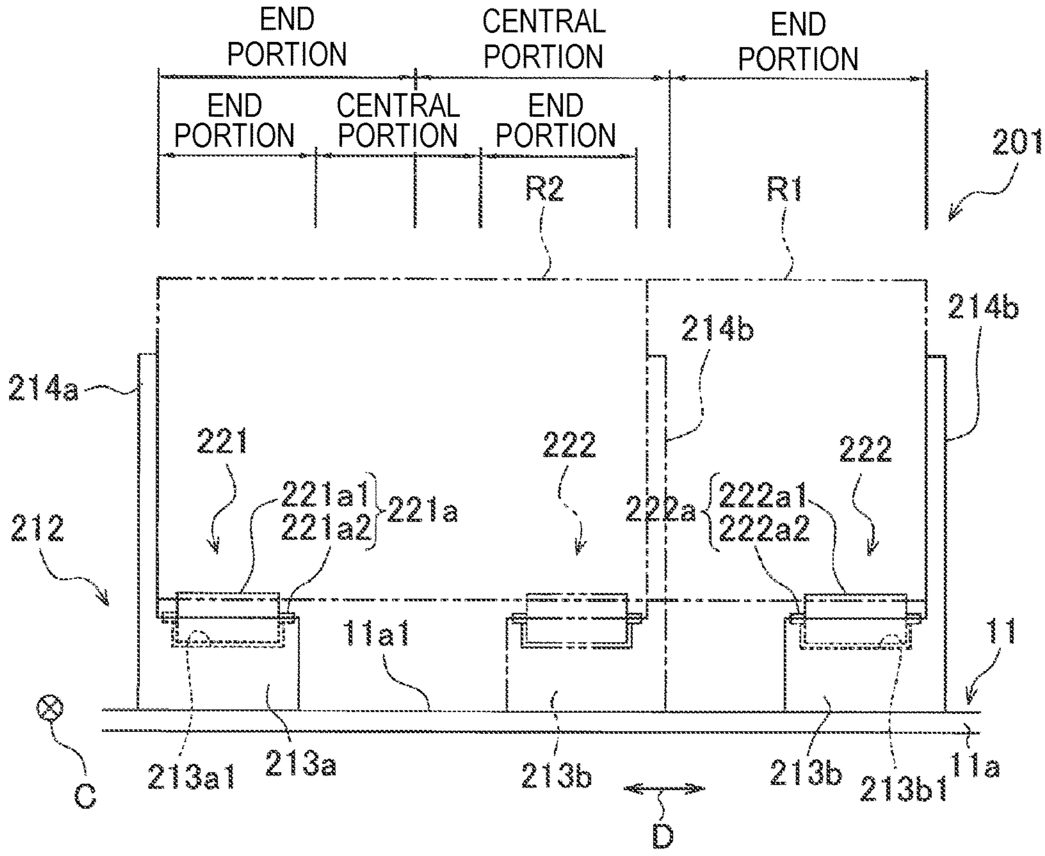
FIGS. 7A and 7B depict a sheet feeding cassette in accordance with a second modified embodiment, where
Figure 7B:
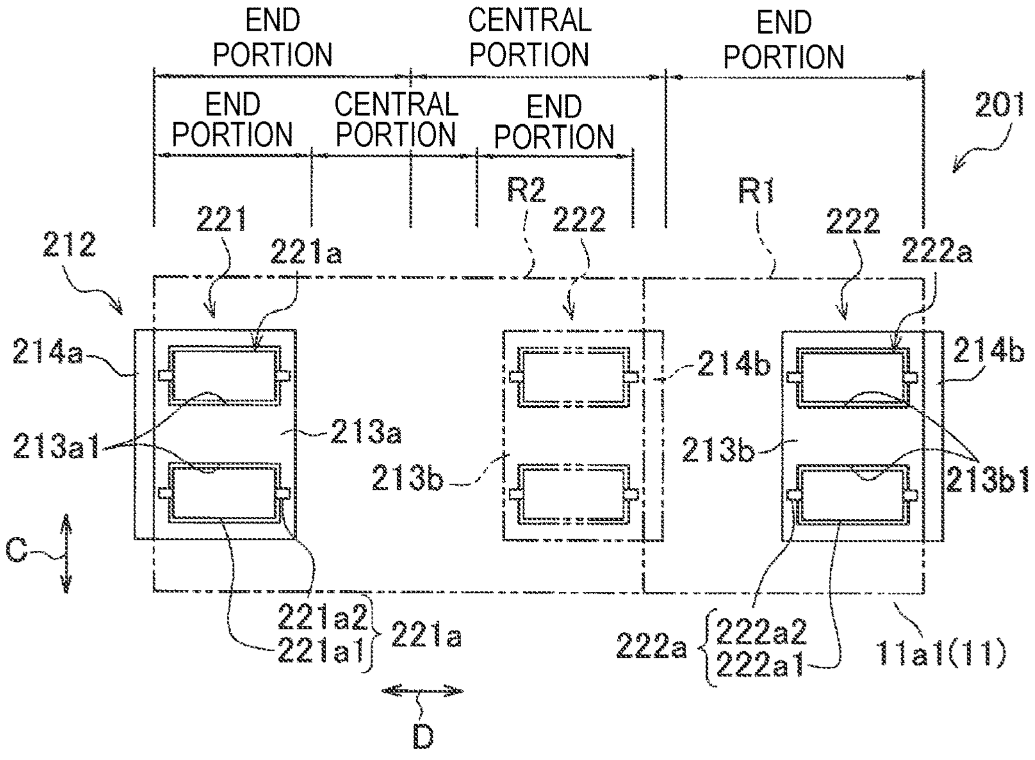

As a second modified embodiment, as shown in FIGS. 7A and 7B, a sheet feeding cassette 201 may include the tray 11, a supporter 212 arranged on the tray 11, and a pair of side guides 214*a*, 214*b*. The similar configurations to the above embodiment are denoted with the same reference signs, and the descriptions thereof are omitted.

As shown in FIGS. 7A and 7B, the supporter 212 includes two support bases 213*a*, 213*b*, and two sets of support roller pairs 221, 222. The support bases 213*a*, 213*b* are arranged side by side apart from each other in the axis direction D. The support base 213*a* is provided to the tray 11 so as to be immovable. The support base 213*b* is provided to the tray 11 so as to be movable in the axis direction D. Each of the support bases 213*a*, 213*b* has a cuboid shape and is provided on its upper surface with two concave portions 213*al*, 213*bl* opened upward. Each of the concave portions 213*al*. 213*b*1 has a size capable of accommodating a lower half part of each of the roller main bodies 221*al*, 222*al*, which will be described later.

As shown in FIGS. 7A and 7B, the two sets of the support roller pairs 221, 222 are each configured by two support rollers 221*a*, 222*a* arranged at each of positions between which the lower ends of the roll sheets R1, R2 are sandwiched in the horizontal direction C. The support rollers 221*a*. 222*a* each have a cylindrical roller main body 221*al*, 222*al*, and a shaft part 221*a*2, 222*a*2 inserted in the roller main body 221*al*, 222*al*. The shaft parts 221*a*2, 222*a*2 are each integrally fixed to the roller main bodies 221*al*, 222*al*. As shown in FIG. 7A, each of the support rollers 221*a*. 222*a* is rotatably supported on the support base 213 via each of the shaft parts 221*a*2, 222*a*2 in a state where a lower half part of each of the roller main bodies 221*al*, 222*al* is arranged at each of the concave portions 213*al*. 213*bl*. The two sets of the support roller pairs 221, 222 of the present modified embodiment correspond to the "two sets of the support roller pairs". The support roller pair 222 of the present modified embodiment corresponds to "one support roller pair".

As shown in FIGS. 7A and 7B, the pair of side guides 214*a*, 214*b* is supported on the supporter 212. More specifically, the side guide 214*a* is a plate-shaped member and is erected on a left end portion of the support base 213*a*. The side guide 214*b* is a plate-shaped member and is erected on a right end portion of the support base 213*b*. The side guide 214*a* is to guide left end faces of the roll sheets R1, R2. The side guide 214*b* is to guide right end faces of the roll sheets R1, R2. The pair of side guides 214*a*, 214*b* of the present modified embodiment corresponds to the "pair of side guides". The side guide 214*b* of the present modified embodiment corresponds to "one side guide".

When accommodating the roll sheet R1 into the sheet feeding cassette 201, the support base 213*b* is arranged at a position shown with the solid line in FIGS. 7A and 7B. More specifically, in a state where the left end face of the roll sheet R1 is brought into contact with the side guide 214*a*, the support base 213*b* is arranged at a position in which the right end face of the roll sheet R1 can be guided in contact with the side guide 214*b*. In this state, the roll sheet R1 is arranged on the two sets of the support roller pairs 221, 222. Thereby, the two sets of the support roller pairs 221, 222 support both end positions of the roll sheet R1 from below without supporting the central portion thereof. Thereby, even when a slight deviation in the upper and lower direction is generated at the support positions in which the two sets of the support roller pairs 221, 222 contact and support the roll sheet R1, a tilt of the rotation axis Rx is reduced, as compared to a configuration of supporting the central portion of the roll sheet R1 in the axis direction D. For this reason, it is possible to suppress the sheet P unrolled from the roll sheet R1 from being skewed.

When accommodating the roll sheet R2 into the sheet feeding cassette 201, the support base 213*b* is arranged at a position shown with the dashed-two dotted line in FIGS. 7A and 7B. That is, the support base 213*b* is moved further leftward in FIGS. 7A and 7B, as compared to the case of accommodating the roll sheet R1, so that the side guide 214*b* is brought into contact with the right end face of the roll sheet R2 whose left end face is in contact with the side guide 214*a*. In this state, the roll sheet R2 is arranged on the two sets of the support roller pairs 221, 222. Thereby, the two sets of the support roller pairs 221, 222 support both end positions of the roll sheet R2 from below without supporting the central portion thereof. Thereby, even when a slight deviation in the upper and lower direction is generated at the support positions in which the two sets of the support roller pairs 221, 222 contact and support the roll sheet R2, a tilt of the rotation axis Rx is reduced, as compared to a configuration of supporting the central portion of the roll sheet R2 in the axis direction D. For this reason, it is possible to suppress the sheet P unrolled from the roll sheet R2 from being skewed.

Furthermore, according to the sheet feeding cassette 201 of the present modified embodiment, the two sets of the support roller pairs 221, 222 contact the outer peripheral surfaces of the lower parts of the roll sheets R1, R2 and support the roll sheets R1, R2. For this reason, it is not necessary to adjust the positions of the roll sheets R1, R2, so that it is possible to facilitate the replacement operation of the roll sheets R1, R2.

The support roller pair 222 of the two sets of the support roller pairs 221, 222 is configured to be movable in the axis direction D. Thereby, when accommodating the separate roll sheet R2 shorter than the roll sheet R1, the support roller pair 222 (support base 213*b*) is moved according to the length of the roll sheet R2, so that it is possible to support both end positions of the roll sheet R2 by the two sets of the support roller pairs 221, 222. For this reason, it is also possible to suppress the sheet P unrolled from the roll sheet R2 from being skewed. Therefore, for each of the plurality of types of the roll sheets R1, R2 having different lengths in the axis direction D, it is possible to suppress the sheet P unrolled from each of the roll sheets R1. R2 from being skewed.

The pair of side guides 214*a*, 214*b* is provided, so that the roll sheets R1, R2 supported on the supporter 212 can be suppressed from shaking in the axis direction D. The support roller pair 222 is configured to be movable together with the side guide 214*b*. Thereby, when accommodating the roll sheet R2 shorter than the roll sheet R1, one side guide 214*b* is simply moved according to the length of the roll sheet R2 so as to guide both end faces of the roll sheet R2 by the pair of side guides 214*a*. 214*b*, so that it is possible to support both end positions of the roll sheet R2 by the two sets of the support roller pairs 221, 222.

Although the favorable embodiments of the present disclosure have been described, the present invention is not limited to the embodiments, and a variety of changes can be made within the scope defined in the claims. For example, in the above embodiment and the first modified embodiment, the sheet feeding cassette 1 includes the four sets of the support roller pairs 21 to 24. However, two or more sets of support roller pairs may be further provided on an inner side of the two sets of the support roller pairs 23, 24. In this case, the support roller pair arranged on a further inner side is preferably configured so that an upper end thereof is positioned on a further lower side. In the above embodiment and the first modified embodiment, any one of the two sets of the support roller pairs 21, 22 and the two sets of the support roller pairs 23, 24 may be provided. Also in this case, since it is possible to support both end portions of the roll sheet, it is possible to achieve the similar effects to the above.

Also in the above embodiment and the first modified embodiment, a pair of side guides capable of guiding both end faces of the roll sheet may be provided. In this case, at least one of the pair of side guides may be configured to be movable in the axis direction D.

In the second modified embodiment, only the support base 213*b* is configured to be movable. However, the support base 213*a* may also be configured to be movable in the axis direction D. In this case, preferably, when one support base is moved toward one side in the axis direction D, the other support base is moved toward the other side in the axis direction D, and when one support base is moved toward the other side in the axis direction D, the other support base is moved toward one side in the axis direction D. This makes it possible for the two sets of the support roller pairs 221, 222 and the pair of side guides 214*a*, 214*b* to be movable in the axis direction D, in a similar manner. The pair of side guides 214*a*, 214*b* may also be configured to be immovable in the axis direction D.

In the above embodiment and the first modified embodiment, at least one support roller pair of two sets of the support roller pairs of any one of the two sets of the support roller pairs 21, 22 and the two sets of the support roller pairs 23, 24 may be configured to be movable in the axis direction D. For example, one support roller pair of the two sets of the support roller pairs 23, 24 is configured to be movable in the axis direction D, so that even when a roll sheet having a length shorter than the roll sheet R2 in the axis direction D is accommodated, it is possible to support both end positions of the roll sheet in the axis direction D by the two sets of the support roller pairs 23, 24.

The roll sheets R1, R2 may be each a coreless roll sheet with no core member Rc. The present invention can be applied to all medium cassettes in which a roll sheet is accommodated.

What is claimed is:

1. A medium cassette, in which a roll medium having a configuration where a continuous medium is rolled in a roll shape is accommodated, the medium cassette comprising:

a supporter including two sets of support roller pairs configured to rotatably support the roll medium, wherein the two sets of the support roller pairs are in contact with an outer peripheral surface of a lower part of the roll medium at each of end positions, where a lower end of the roll medium is sandwiched between the support roller pair, of the roll medium in a direction of a rotation axis of the roll medium, and are not in contact with the outer peripheral surface of the lower part of the roll medium at a central portion of the roll medium in the direction of the rotation axis, wherein the supporter further includes two sets of inner support roller pairs arranged on an inner side of the two sets of the support roller pairs in the direction of the rotation axis and having upper ends arranged in lower positions than upper ends of the two sets of the support roller pairs, the two sets of the inner support roller pairs are configured to rotatably support a separate roll medium having a length shorter than the roll medium in the direction of the rotation axis, and the two sets of the inner support roller pairs are in contact with an outer peripheral surface of a lower part of the separate roll medium at each of end positions, where a lower end of the separate roll medium is sandwiched between the inner support roller pair, of the separate roll medium in a direction of a rotation axis of the separate roll medium, and are not in contact with the outer peripheral surface of the lower part of the separate roll medium at a central portion of the separate roll medium in the direction of the rotation axis, and wherein each roller included in the two sets of the inner support roller pairs have a rotation axis being located at a position lower than a position of a rotation axis of each roller included in the two sets of the support roller pairs.

2. The medium cassette according to claim 1, wherein each support roller of the two sets of the support roller pairs and the two sets of the inner support roller pairs is configured by an individual roller having an individual shaft part.

3. The medium cassette according to claim 1, wherein a common shaft part is provided with support rollers of the two sets of the support roller pairs and the two sets of the inner support roller pairs, the support rollers arranged on each of both sides between which the lower ends of the roll medium and the separate roll medium are sandwiched.

4. The medium cassette according to claim 1, wherein at least one support roller pair of the two sets of the support roller pairs is configured to be movable in the direction of the rotation axis.

5. The medium cassette according to claim 4, further comprising a pair of side guides configured to guide both end faces, in the direction of the rotation axis, of the roll medium supported on the supporter.

6. The medium cassette according to claim 5, wherein at least one side guide of the pair of the side guides is configured to be movable in the direction of the rotation axis, and the one support roller pair is configured to be movable together with the one side guide.

* * * * *